(12) United States Patent
Ochsner et al.

(10) Patent No.: US 11,290,476 B1
(45) Date of Patent: Mar. 29, 2022

(54) TIME BOUNDED LOSSY COUNTERS FOR NETWORK DATA

(71) Applicant: Amazon Technologies, Inc., Seattle, WA (US)

(72) Inventors: Evan Ochsner, Billerica, MA (US); Raisa Karasik, Arlington, MA (US); Andrey Dolgikh, Arlington, MA (US)

(73) Assignee: Amazon Technologies, Inc., Seattle, WA (US)

( * ) Notice: Subject to any disclaimer, the term of this patent is extended or adjusted under 35 U.S.C. 154(b) by 29 days.

(21) Appl. No.: 16/699,494

(22) Filed: Nov. 29, 2019

(51) Int. Cl.
```
G06F 7/00        (2006.01)
H04L 29/06       (2006.01)
H04L 43/106      (2022.01)
H04L 67/10       (2022.01)
H04L 61/5007     (2022.01)
```
(52) U.S. Cl.
CPC ........ *H04L 63/1425* (2013.01); *H04L 43/106* (2013.01); *H04L 61/2007* (2013.01); *H04L 67/10* (2013.01)

(58) Field of Classification Search
CPC ... H04L 63/1425; H04L 67/10; H04L 43/106; H04L 61/2007
See application file for complete search history.

(56) References Cited

U.S. PATENT DOCUMENTS

| | | | |
|---|---|---|---|
| 2007/0198548 A1* | 8/2007 | Lee | G06F 16/24561 |
| 2019/0068623 A1* | 2/2019 | Yermakov | H04L 63/0236 |
| 2020/0159594 A1* | 5/2020 | Kyaw | G06F 16/285 |

* cited by examiner

*Primary Examiner* — Kim T Nguyen
(74) *Attorney, Agent, or Firm* — Davis Wright Tremaine LLP

(57) ABSTRACT

A lossy counter counts distinct network data items. The lossy counter includes a count sketch bounded by a predetermined value to limit the number of distinct network data items included in the count sketch. The count sketch may include counts for a set of distinct network data items. The lossy counter has an associated time interval, and the first set of distinct network data items and the second set of distinct data items include timestamps that coincide with the time interval associated with the lossy counter.

20 Claims, 8 Drawing Sheets

TIME BOUNDED LOSSY COUNTERS FOR NETWORK DATA

BACKGROUND

Maintaining cybersecurity is critical for most entities, such as corporations that use and maintain data in a distributed computing environment. Therefore, security frameworks for distributed computing environments were developed to meet the growing cybersecurity demand. Those security frameworks generally monitor distributed computing environments for malicious activity and unauthorized behavior and generate security alerts. To investigate these security alerts, the user must manually analyze cybersecurity data and other data from the distributed computing environment to determine if the activity or behavior is serious or requires further attention.

Security frameworks related to cybersecurity provide an analyst with basic information about potential malicious activity or unauthorized behavior, such as when the activity or behavior occurred. The provided basic cybersecurity related information is often insufficient, as cybersecurity experts may require other information, such as context associated with the activity or behavior, to decide whether action is required to mitigate the suspected malicious activity or unauthorized behavior.

BRIEF DESCRIPTION OF THE DRAWINGS

Various techniques will be described with reference to the drawings, in which.

DETAILED DESCRIPTION

Figure 1:
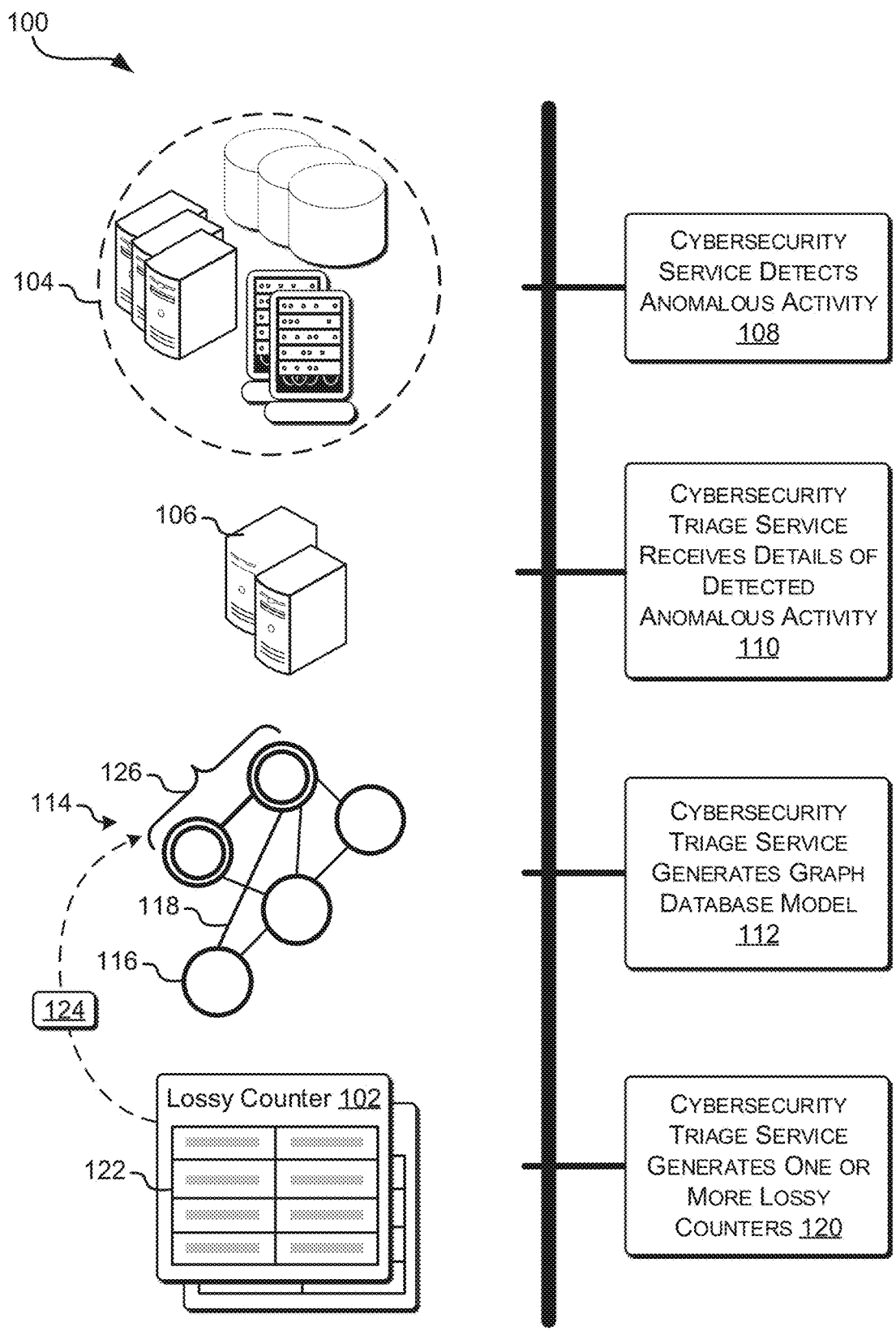
FIG. 1 illustrates a process flow that generates one or more lossy counters associated with lossy count implementations described herein.

The following description covers lossy count implementations that provide counts of network data items identified or referenced in one or more log files or a data stream. The counts of network data items may be in a data structure described herein as a lossy counter. The lossy counter may include a count sketch. That count sketch includes counts for individual network data items, where each network data item in the count sketch is distinct. The count sketch may be bounded. In particular, the count sketch may be configured to count only the most commonly occurring network data items identified in the log files or the data stream. If the number of distinct items exceeds the bound, the lossy counter is able to determine which items are the most common and will preserve those items while discarding less frequent items. One can infer upper and lower bounds from the lossy counter for all items, whether they are kept or discarded. The network data items identified in the log files or the data stream may include metric or statistical information associated with those network data items, such as data indicating source and destination IP addresses, byte values, packet information, and the like. Example network data items include application programming interface (API) calls, both successful and failed, internet protocol (IP) address information for incoming and outgoing traffic associated with a distributed computing environment, source and destination ports for the traffic, domain name system (DNS) requests, and so forth.

In some implementations, the lossy count implementations process log file data or a data stream with some number of network data items identified in the log file data or the data stream. In one example, the identified network data items may be API calls and information in the form of data that indicates IP addresses that issued the API calls and IP addresses that received the API call, as well as other metric and statistical information related to the API calls. In another example, the network data items are represented as bytes exchanged between IP addresses. In a particular example, the network data items are represented as bytes exchanged between one or more ports of the IP addresses.

The lossy count implementations consume minimal overhead and allocate space only when needed. Furthermore, the lossy count implementations can be used in a streaming mode, where the implementations process one network data item references at a time from storage or from one or more log files, or the lossy implementations can break the stream into several batches (or substreams), process each one individually, and then combine them without a loss of accuracy. These batches could be used, for example, in a distributed computing environment to parallelize and speed up the process of counting items. The lossy count implementations are also able to use separate lossy counters to cover different time periods, so that the most popular network data items (or the frequency of any given network data item) can be measured over arbitrary time periods.

A time series of lossy counters may be used to answer several types of questions. The lossy count implementations may be used with a long-running stream of network data, and for each hour a lossy counter may be stored for one or more network data items in the stream of data seen that hour. The lossy count implementations may compute a time series for each distinct network data item in the stream of data with a sample rate of one or more hours, one day, any multiple of days, weeks, months, etc. The most popular and common network data items during each of the hours, previous days, weeks, or months may be determined using the lossy count implementations. One set of counters for hourly cadence, daily cadence, another for weekly cadence, and so on, are not required. Instead, the lossy count implementations may be used to merge, as needed per analysis requirements, lossy counters in adjacent time bins to down sample the time series. Lossy counters in non-adjacent bins can also be merged, for example to obtain the most popular items in each hour of day by merging all lossy counters that cover 1 PM-2 PM on any day, merging all lossy counters that cover 2 PM-3 PM on any day, and so on.

In some implementations, the lossy count implementations provide one or more lossy counters that each include a count sketch. The count sketch includes counts of network data items, such as data bytes communicated between IP addresses or ports, API calls by IP addresses, DNS request data, and so forth, in a data stream. The network data items in the count may be obtained from a graph database model. The graph database model may include graph nodes and graph edges having underlying associated data. In some embodiments, the network computing device may update the configuration and composition of graph database models to reflect the relationships between two or more elements or network data items in a monitored network. Graph nodes of the graph database model may represent network elements such as domains, IP addresses, and the like, in the network and the graph edges of the graph model may represent actions or communication (e.g., API calls, communicated data in bytes, packet volume, etc.) between instances, such as IP addresses, in the network. In some implementations, the network data items in the data stream are associated with one or more graph nodes and/or graph edges of the graph database model.

The count sketch is bounded by a predetermined number of distinct network data items that may be contained in the sketch. Specifically, the count sketch may be limited to including a count for a particular number of distinct network data items. When the number of distinct network data items exceeds that number, the count sketch is pruned to remove one or more of the distinct network data items. The predetermined number of distinct network data items is, in some implementations, user settable. The predetermined number of distinct network data items in the count sketch may also be machine determined based on memory or storage constraints. In other implementations, the predetermined number of distinct network data items is based on a desired level of accuracy for the count sketch. The count sketch is exact when the number of distinct network data items counted in the sketch is less than or equal to the predetermined number of distinct network data items. If the number of distinct items exceeds the bound, the lossy counter is able to determine which items are the most common and will preserve those items while discarding less frequent items.

The count sketch may maintain a hash map with counts of network data items observed in a data stream. The hash map may be a tree map or other suitable map. The hash map is limited in size according to the predetermined number of distinct network data items that may be contained in the count sketch. The hash map associated with the count sketch may also include a tally of a total number of network data items observed in the data stream. The tally of the total number of network data items observed is updated consistently over a time duration of the count sketch. Furthermore, the hash map may include a tally of the number of network data items subtracted from the count sketch. One or more network data items are subtracted from the count sketch when the individual network data items in the count sketch exceed the predetermined number of network data items. More particularly, the lossy count implementations may prune, subtract, or otherwise remove infrequent network data items from the count sketch whenever the number of distinct network data items within the sketch exceeds the predetermined number of distinct network data items. This pruning technique of the lossy count implementations ensures that a size of the count sketch is efficiently maintained, the most common items are preserved in the sketch, and the counts of all items (whether they are preserved in the sketch or dropped) are known to within an error inversely proportional to the predetermined size limit of the sketch.

The hash map of the count sketch may include key/value pairs to represent the network data items counted in the sketch. In some implementations, for each distinct network data item counted in the hash map, a tuple, including a lossy count value and a decrement value, is provided as the value portion of an associated key/value pair. The key portion of the key/value pair includes a name for a distinct network data item counted in the hash map of the count sketch.

The use of key/value pairs to represent the network data items counted in a count sketch eases a process of merging distinct count sketches. The process of merging the count sketches involves adding the respective subtractions in each of the hash maps. Furthermore, the total number of network data items seen by each of the count sketches are summed. The two summation values, specifically the summation value of the subtracted network data items and the summation of the total number of network data items, are associated with a hash map representing a merger of the two count sketches. Additionally, the network data item key/value pairs represented in the hash maps of the two count sketches, respectively, are added to the hash map representing the merger of the two count sketches. The hash map representing the merger of the two count sketches is then pruned to ensure that the hash map of the merged count sketches includes network data items less than or equal to the predetermined number of distinct network data items that may be contained in the sketch.

The described lossy count implementations offer numerous advantages when used in the context of cybersecurity, network diagnostics, network system management, and so forth. Data associated with such contexts comes in huge volumes with numerous features. For example, cybersecurity systems often need to track a number of distinct domains in DNS data. This number can easily run into the millions. Additionally, a number of distinct IP addresses seen by a company or even one account associated with a distributed computing environment can easily reach into the millions. Keeping track of all ports of the IP addresses used by every instance, or of API calls used by every user or role can also be huge. The described lossy count implementations, in particular the use of the described count sketches, efficiently process large amounts of network data item information without overwhelming computer implemented storage and processing capabilities. Specifically, a count sketch limits the number of network data items tracked, such as domain names, IP addresses, API calls, etc., by keeping track of prevalent network data items from the log files generated by the distributed computing environment and eliminating those network data items that occur infrequently. Therefore, the described lossy count implementations efficiently and accurately track prevalent network data items with excellent accuracy while simultaneously sustaining the consumption of computer implemented processing, memory and storage at reasonable levels.

In the preceding and following description, various techniques are described. For purposes of explanation, specific configurations and details are set forth in order to provide a thorough understanding of possible ways of implementing the techniques. However, it will also be apparent that the techniques described below may be practiced in different configurations without the specific details. Furthermore, well-known features may be omitted or simplified to avoid obscuring the techniques being described.

Using the techniques and technologies described herein, for generating lossy counters associated with network data items that may be linked to anomalous or unauthorized behavior associated with computing systems and devices, one skilled in the art will appreciate in light of this disclosure that certain embodiments may be capable of achieving certain advantages, including some or all of the following: (1) improving the identification and dissemination of network data items that may be linked to anomalous or unauthorized behavior in a computing system; (2) reducing the use of computing resources previously required to analyze network data items that may be linked to anomalous or unauthorized behavior associated with computing systems and devices; (3) reducing the use of computing resources, such as processor use, network bandwidth, and storage capacity, through the use of lossy counters that store the most relevant or frequent network data items that may be linked to anomalous or unauthorized behavior associated with computing systems and devices; and so forth.

FIG. 1 illustrates a process flow 100 that generates one or more lossy counters 102. The process flow 100 may involve one or more computing resources of a distributed computing environment 104. The one or more computing resources of the distributed computing environment 104 may operate together, and in some cases, the one or more computing resources are operatively attached to one another via one or more networks. For example, the distributed computing environment 104 may include a switch, router, network interface device, one or more computing devices or servers and/or data storage devices. Other devices may also be part of the distributed computing environment 104. Furthermore, devices of the distributed computing environment 104 may couple to, thereby enabling exchange of network data items, computing devices that are external to the distributed computing environment 104.

The following description describes the use of the one or more lossy counters 102 in the context of cybersecurity. However, the use of the one or more lossy counters 102 may be extended beyond the context of cybersecurity. For example, the lossy counters 102 described herein may be used to provide counts of distinct data items and types in the contexts of network diagnostic tools that detect anomalous behavior in computer systems and computer networks, device configuration tools that manage the implementation of unique types of computing devices, and so forth. In general, the described lossy counters 102 may be used with any context in which it is desirable to store and represent large amounts of data while retaining counts of the important data, over a time period, that may require further analysis.

In some implementations, one or more service provider computing devices 106 such as, but not limited to, servers or server farms, may implement one or more of the described lossy count implementations. The one or more service provider computing devices 106 may implement a cybersecurity service. The cybersecurity service may be a threat detection service that monitors computing resources of the distributed computing environment 104 for anomalous activity and unauthorized behavior linked to computing devices, accounts, and workloads in the distributed computing environment 104. The cybersecurity service may also monitor computing devices external to the distributed computing environment 104 for anomalous activity and unauthorized behavior.

In some implementations, the cybersecurity service implements a plurality of services for detecting anomalous activity and unauthorized behavior. One such service generates log files related to actions of resources or elements, such as an account, a user, a role, or a distributed system service. The log files from the service may contain network data about API calls associated with entities of the distributed computing environment 104 as well as entities external of the distributed computing environment 104. Furthermore, the log files may include network data identifying when such API calls were issued by way of timestamp information associated with the API calls, IP addresses associated with those API calls, user-agent information linked to the API calls, and a geographical region(s) in which the API calls were triggered. The log files and the indicated network data contained therein may cause the cybersecurity service to trigger an alarm instance indicating potential anomalous activity and unauthorized behavior.

Another service provided by the cybersecurity service may generate log files including network data summarizing network data traffic between other elements, such as source addresses and destination addresses. Alternatively or in addition, the cybersecurity service may ingest, collect, and/or analyze log files generated by the one or more entities associated with the distributed computing environment 104. Those addresses may be IP addresses. Furthermore, the service tracks the source and destination ports of the network data traffic and the timeframe, via timestamp information associated with the network data traffic, over which the network data traffic occurred. The network data traffic tracked by the service may comprise a total number of bytes transferred in each direction as well as the number of packets transferred in each direction. The log files including data summarizing network data traffic between source addresses and destination addresses may also cause the cybersecurity service to trigger an alarm instance indicating potential anomalous activity and unauthorized behavior.

Yet another service provided by the cybersecurity service generates DNS data that is stored in one or more log files. The DNS communication protocol resolves domain names to IP addresses and enables IP to IP communication between a computing resource and a computing device hosting a domain's web server. Generally, the DNS communication protocol is used by an application, such as a web browser, to send a request to resolve a domain name, followed by a response from a DNS server that provides the IP address(es) that hosts the domain. The one or more log files generated by the cybersecurity service store information related to network data items, such as metric or statistical information related to the network data items, requests and responses related to the network data items, and timestamps linked to those requests and responses.

The DNS communication protocol may be abused by an attacker. For example, common DNS communication protocol attacks include data exfiltration via DNS tunneling, use of domain generation algorithms (DGA), and command and control of the malware. The one or more log files generated by the cybersecurity service may be used by an analyst to trigger an alarm indicating possible anomalous activity and unauthorized behavior related to the DNS communication protocol.

In general, the described log files are sufficient in enabling the cybersecurity service to produce a detection of potential anomalous activity 108 associated with computing resources of the distributed computing environment 104. Specifically, network data item information in a log file often provide an analyst with basic information about an entity or entities that caused the activity, the potential anomalous activity, and when the activity happened. But such information is often insufficient, as analysts may require context around the activity to decide whether it requires further action.

Many pieces of contextual information associated with the distributed computing environment 104 can have cardinalities that prevent a full accounting of network data in log files in a reasonable time frame. For example, consider IP address connections of a busy web server, the number of remote IP addresses, even in a small timeframe, can be extremely large. Knowing that it is impossible to efficiently analyze all of the network data in a particular contextual environment, a triage tool is required to present network data item information, from log files and such, in a digestible way that is both true to the nature of the original network data items and succinct enough to allow for efficient consumption. The lossy counter(s) 102 provided by the lossy count implementations described herein is one such triage tool.

At 110 of the process flow 100, the cybersecurity service alerts a triage cybersecurity service of the anomalous activity detected at 108. The triage cybersecurity service may be implemented by the one or more service provider computing devices 106. The alert provided to the triage cybersecurity service may include one or more log files including network data item information, including statistical information and the like, related to the anomalous activity detected at 108. In some implementations, the cybersecurity service may provide the network data item related information in a data stream generated from the one or more log files including the network data item related information. In other implementations, the cybersecurity service may provide the information related to network data items in a data stream generated from one or more storages including the information related to network data items that may be relevant to the suspected anomalous activity detected at 108.

At 112 of the process flow 100, the triage cybersecurity service processes the one or more log files to generate at least one graph database model 114. The at least one graph database model 114 may be displayed in a graphical user interface (GUI) associated with the one or more service provider computing devices 106, for example. The graph database model 114 includes a plurality of graph nodes 116 and graph edges 118 and underlying network data item information for the graph nodes 116 and graph edges 118 generated from the one or more log files. The network data item information associated with the graph nodes 116 and graph edges 118 is stored in memory or storage of the computing devices 106. Graph nodes 116 and associated network data item information of the graph model 114 may represent and relate to domains, IP addresses, users, accounts, computing devices, and the like, in a network. The graph edges 118 and associated network data item information of the graph model 114 may represent actions or communication (e.g., API calls, communicated data in bytes, packets, etc.) between graph nodes 116 in the graph model 114. The graph edges 118 may also represent relationships between the graph nodes 106 in the graph model 114, such as an account having ownership over one or more users or computing devices, or IP addresses belonging to a network subdomain of the environment 104. Therefore, the graph database model 114 may include graph nodes 116 and graph edges 118 comprising underlying network data item information associated with a timeframe linked to the anomalous activity detected at 108.

At 120 of the process flow 100, the triage cybersecurity service generates the one or more lossy counters 102. Each of the lossy counters 102 may include a count sketch embodied in a hash map 122. The hash map 122 may include counts of network data items, observed in information associated with a data stream, retrieved from the one or more log files, or some other data structure or storage. The hash map 122 is limited in size according to a predetermined number of distinct network data items that may be contained in the count sketch. The hash map 122, or more particularly the lossy counter 102, may also include a tally of a total number of network data items observed in information associated with the data stream. The tally of the total number of network data items observed is updated consistently over a time duration of the count sketch. Furthermore, the hash map 122 may include a tally of the number of network data items subtracted from the count sketch. One or more network data items are subtracted from the count sketch when the individual network data items in the count sketch exceed the predetermined number of distinct network data items. More particularly, the lossy count implementations may prune or subtract network data items from the count sketch whenever the number of distinct network data items within the sketch exceeds the predetermined number of network data items. This pruning technique of the lossy count implementations ensures that the count sketch size is efficiently maintained.

The lossy counter 102 generated by the process flow 100 may be linked 124 or associated with one or more of the graph nodes 116 and graph edges 118 of the graph database model 114. For example, the lossy counter 102 may be linked 124 to a grouping 126 of the graph nodes 116 and graph edges 118. Linking 124 the lossy counter 102 with the graph database model 114 allows an analyst, customer of one or more services provided by the distributed computing environment 104, or other users to quickly review the network data items counted by the lossy counter 102, while interacting with the graph database model 114. As previously stated, the lossy counter 102 limits the number of distinct network data items tracked in connection with the grouping 126, such as domain names, IP addresses, etc., while keeping track of the most popular network data items associated with data of the graph nodes 116 and graph edges 118 in the grouping 126.

Figure 2:
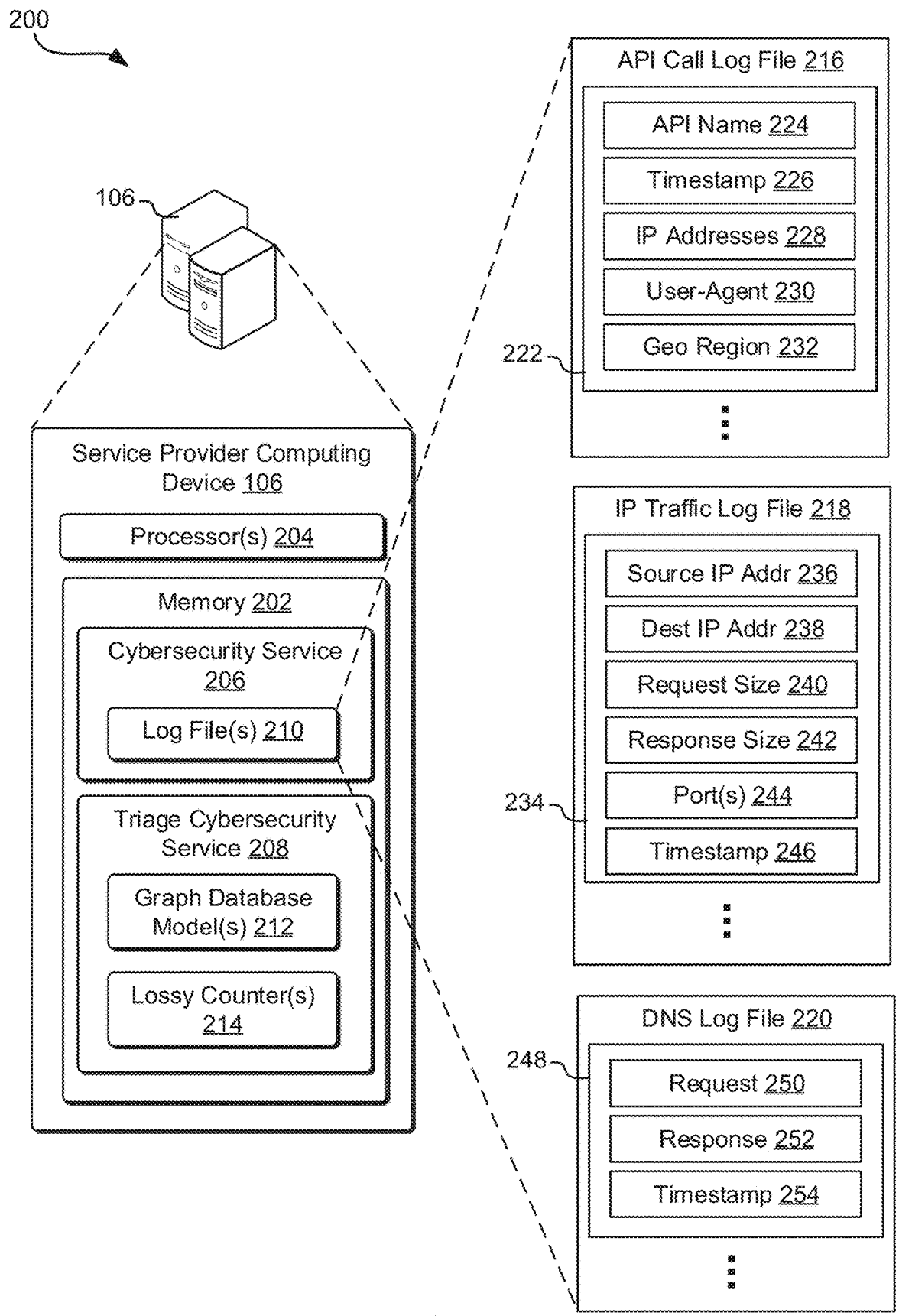
FIG. 2 illustrates details of log files associated with one or more service provider computing devices that may implement the lossy count implementations.

FIG. 2 illustrates additional details 200 of the one or more service provider computing devices 106 that may implement one or more of the described lossy count implementations. In one configuration, the service provider computing device 106 may include at least one memory 202 and one or more processing units (or processor(s)) 204. The processor 204 may be implemented as appropriate in hardware, computer-executable instructions, firmware, or combinations thereof. Computer-executable instruction or firmware implementations of the processor 204 may include computer-executable or machine-executable instructions written in any suitable programming language to perform the various described functions.

The memory 202 may store program instructions that are loadable and executable on the processor 204, as well as data generated or used during the execution of these program instructions. Depending on the configuration and type of the service provider computing device 106, the memory 202 may be volatile (such as random access memory (RAM)) and/or non-volatile (such as read-only memory (ROM), flash memory, etc.). The service provider computing device 106 may also include additional storage, which may include removable storage and/or non-removable storage. The additional storage may include, but is not limited to, magnetic storage, optical disks and/or tape storage. The disk drives and their associated computer-readable media may provide non-volatile storage of computer-readable instructions, data structures, program modules, program services and other data for the service provider computing device 106. In some implementations, the memory 202 may include multiple different types of memory, such as static random access memory (SRAM), dynamic random access memory (DRAM), or ROM.

Alternatively, computer-readable communication media may include computer-readable instructions, program modules, or other data transmitted within a data signal, such as a carrier wave, or other transmission. However, as used herein, computer-readable storage media does not include computer-readable communication media.

The service provider computing device 106 may also contain communications connection(s) that allow the service provider computing device 106 to communicate with a stored database, another computing device or server, user terminals and/or other devices on networks, such as networks associated with the distributed computing environment 104 and/or other networks external to the distributed computing environment 104. The service provider computing device 106 may also include input/output (I/O) device(s), such as a keyboard, a mouse, a pen, a voice input device, a touch input device, a display, speakers, a printer, etc. In one example, the display of the service provider computing device 106 displays a GUI that includes one or more graph database models 212 and/or lossy counter(s) 214.

In some implementations, the memory 202 may comprise a cybersecurity service 206 and a triage cybersecurity service 208. The cybersecurity service 206 may have associated one or more log files 210. The triage cybersecurity service 208 may have associated one or more graph database models 212 and one or more lossy counters 214. Furthermore, the one or more graph database models 212 may include the graph database model 114 illustrated in FIG. 1. Additionally, the lossy counters 214 may include the lossy counter 102.

As is illustrated in FIG. 2, a number of different log files may be associated with the log files 210. In general, the described log files may be generated by various devices within the distributed computing environment 104 and/or devices external of the environment 104. In the illustrated example, the log files 210 comprise an API log file 216, an IP traffic log file 218 and a DNS log file 220. Each of the illustrated log files 216-220 may include network data item information of network data times counted by one or more of the lossy counters 214.

Furthermore, each of the illustrated log files 216-220 may include network data item related information leveraged for representation in one or more of the graph database models 212. For example, any one or more of the log files 216-220 and/or log entries 222, 234, and 248 may be network data item information leveraged for representation in one or more of the graph database models 212 and/or counted by one or more of the lossy counters 214.

The API call log file 216 may include a plurality of log entries 222, each of which store information relevant to a particular API call. For example, each of the log entries 222 may include an API name 224, a timestamp 226, one or more IP addresses 228, user-agent information 230, and a geographical region 232. The timestamp 216 may comprise a date and time of an API call associated with the API name 224. The one or more IP addresses 228 may identify a source IP address of an API call and a destination IP address of the API call. The user-agent 230 information may be a data string that allows network protocol peers to identify the application type, operating system, software vendor or software version associated with an API call. The geographical region 232 may identify an area, such as Europe or a country in Europe, associated with the API call. The API call log file 216 may include data representing many different API calls, where some of those API calls utilize a common API (e.g., API name). Each of the log entries 222 is a network data item stored by the API call log file 216. It is contemplated that the API call log file 206 may include additional log entries 222 not shown, fewer log entry components than shown, or different combinations, configurations, or quantities of the log entry components shown.

The IP traffic log file 218 also includes a plurality of log entries 234. For example, each of the log entries 234 may include a source IP address 236, a destination IP address 238, a request size 240, a response size 242, and one or more ports 244. The source IP address 236 identifies the IP address of the computing device originating a request associated with any given log entry 234. The destination IP address 238 identifies the IP address of the computing device to receive the request. The request size 240 and the response size 242 are each a byte value in some implementations. The port(s) 244 identifies a port number associated with the IP address of the computing device to receive the request and/or a port number associated with the IP address of the computing device that generated or provided the request. Furthermore, each of the log entries 234 may include a timestamp 246. The timestamp 246 provides date and time information associated with the request. It is contemplated that the IP traffic log file 218 may include additional log entries 234 not shown, fewer log entry components than shown, or different combinations, configurations, or quantities of the log entry components shown.

The DNS log file 220 also includes a plurality of log entries 248. Each of the log entries 248 may include a request 250, a response 252, and a timestamp 254. The request 250 may be generated by an application associated with a computing device, where the request is to resolve a domain name. The response 252 may be provided by a DNS server. The DNS server may be associated with the distributed computing environment 104 or computing entities external of the distributed computing environment 104. The timestamp 254 provides date and time information associated with a request and/or response. It is contemplated that the DNS log file 220 may include additional log entries 248 not shown, fewer log entry components than shown, or different combinations, configurations, or quantities of the log entry components shown.

Figure 3:
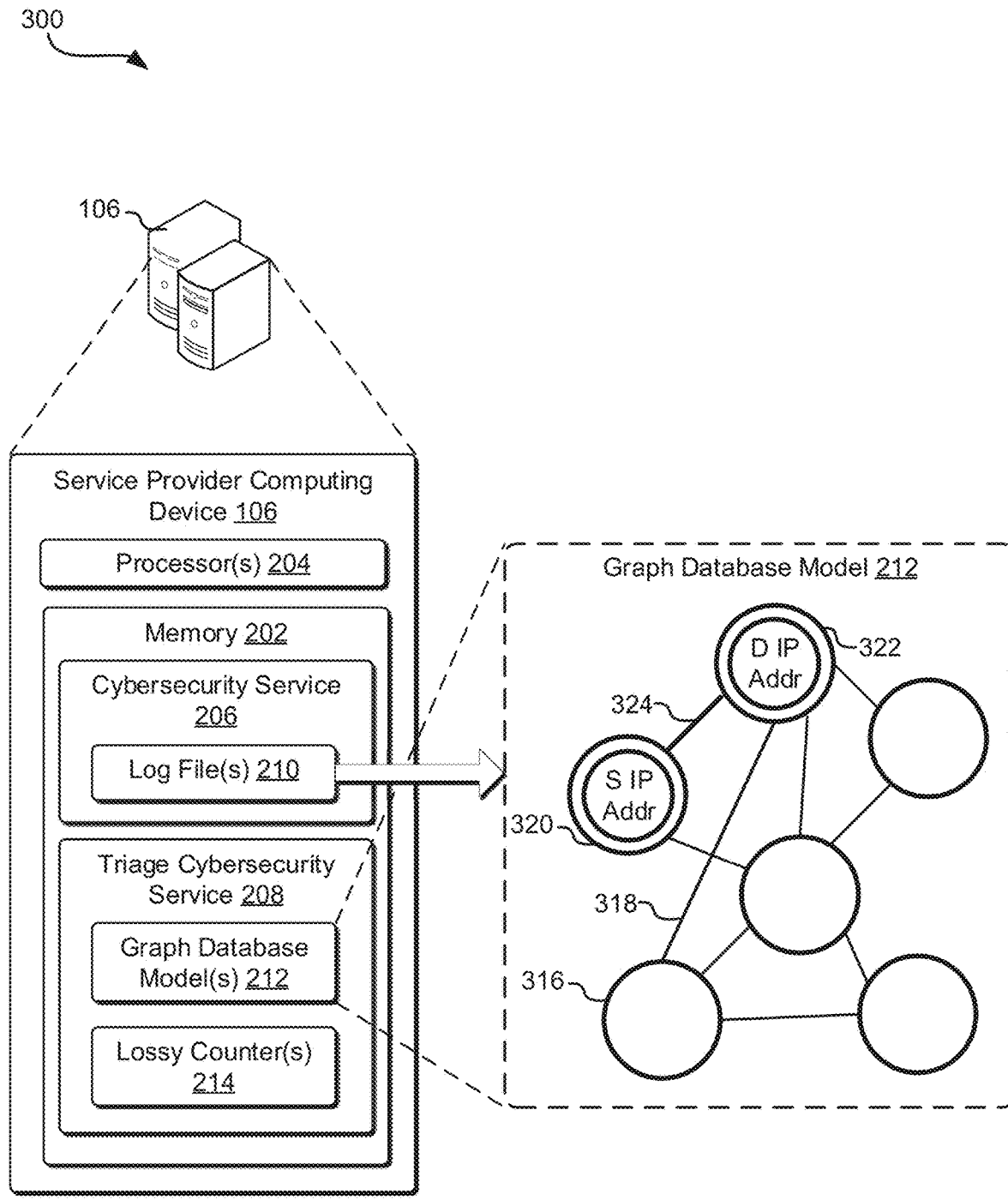
FIG. 3 illustrates details of a graph database model associated with one or more service provider computing devices that may implement one or more of the described lossy count implementations.

FIG. 3 illustrates additional details 300 of the one or more service provider computing devices 106 that may implement one or more of the described lossy count implementations. Specifically, a graph database model 212 is illustrated. In some implementations, graph database model 212 is generated by the triage cybersecurity server 208. The graph database model 212 includes a plurality of graph nodes 318 and graph edges 316 connecting pluralities of the plurality of graph nodes 318. It is contemplated that the triage cybersecurity service 208 may include additional graph database models 212 not shown, or different combinations, configurations, or quantities of the graph nodes and edges shown in the graph database model 212 illustrated in FIG. 3. For example, the graph database models 212 hosted by the triage cybersecurity service 208 may include, among others, the graph database model 114 illustrated in FIG. 1.

In some implementations, the triage cybersecurity service 208 processes network data items of one or more of the log files 210 hosted by the cybersecurity service 206 to generate the graph database model 212. For example, when anomalous or unauthorized activities, associated with the distributed computing environment 104 and/or computing resources coupled to the distributed computing environment 104, are detected by the cybersecurity service 206, the cybersecurity service 206 may identify one or more of the log files 210 that are potentially relevant to the anomalous or unauthorized activities. Those log files 210 are processed by triage cybersecurity service 208 to generate at least the illustrated graph database model 212. The processing by the triage cybersecurity service 208 may comprise receiving a data stream including network data item information from the cybersecurity service 206, or from other elements within the distributed computing environment 104. In other implementations, the triage cybersecurity service 208 receives the log files 210 from the cybersecurity service 206 and processes those log files 210 to generate a count of at least some of the network data items identified therein. Other graph database models may be generated by the triage cybersecurity service 208 depending on the complexity of the data in the log files 210 and the scope of the anomalous or unauthorized activities detected by the cybersecurity service 206.

As indicated, the graph database model 212 includes a plurality of graph nodes 316 and graph edges 318 and underlying network data item information for the graph nodes 316 and graph edges 318 generated from the one or more log files 210. The graph nodes 316 and associated network data item information of the graph database model 212 may represent and relate to domains, IP addresses, and the like, in a network. The graph edges 318 and associated network data item information of the graph database model 212 may represent actions (e.g., API calls, communicated data in bytes, packets, etc.) between graph nodes 316 in the graph database model 212. Therefore, the graph database model 212 may include graph nodes 316 and graph edges 318 comprising underlying network data item information associated with a timeframe or time period linked to the anomalous activity detected by the cybersecurity service 206. In general, the network data item information contained in the API call log file 216, IP traffic log file 218, and DNS log file 220 may be used to construct the graph database model 212. However, it is contemplated that network data item information from other log files not shown, or different combinations, configurations, or quantities of network data item information may be used to construct the graph database model 212.

In the illustrated example, graph node 320 is associated with a source IP address and the graph node 322 is associated with a destination IP address. The graph edge 324 has associated underlying network data item information related to actions between the source IP address represented by the graph node 320 and the destination IP address represented by the graph node 322. For example, the actions may be API calls associated with the source IP address and directed to the destination IP address. Alternatively, or in addition, the actions may be packets or other communications between the source IP address and the destination IP address. Such actions may be represented as data values in bytes exchanged between the source IP address and the destination IP address. In yet another example, the actions may be DNS data exchanged between the source IP address and the destination IP address.

In this non-limiting example, the underlying data items associated with the graph edge 324 are a plurality of API calls generated by the source IP address and directed to the destination IP address. The API calls may be associated with one or more of the API call log files 216 maintained by the cybersecurity service 206. One or more of the API calls may be associated with suspected anomalous or unauthorized behavior identified by the cybersecurity service 206. The suspected anomalous or unauthorized behavior cause the cybersecurity service 206 to identify log files 210 that contain network data item information that may be relevant to the suspected anomalous or unauthorized behavior.

A lossy counter 214 or a plurality of lossy counters 214 may be generated by the triage cybersecurity service 208. The lossy counter 214 may count distinct network data items identified in the log files 210 identified by the cybersecurity service 206 as being relevant to the suspected anomalous or unauthorized behavior. In this example, the lossy counter 214 may include a count of distinct API calls underlying the graph edge 324 and associated with the source IP address represented by the graph node 320 and the destination IP address represented by the graph node 322.

Figure 4:
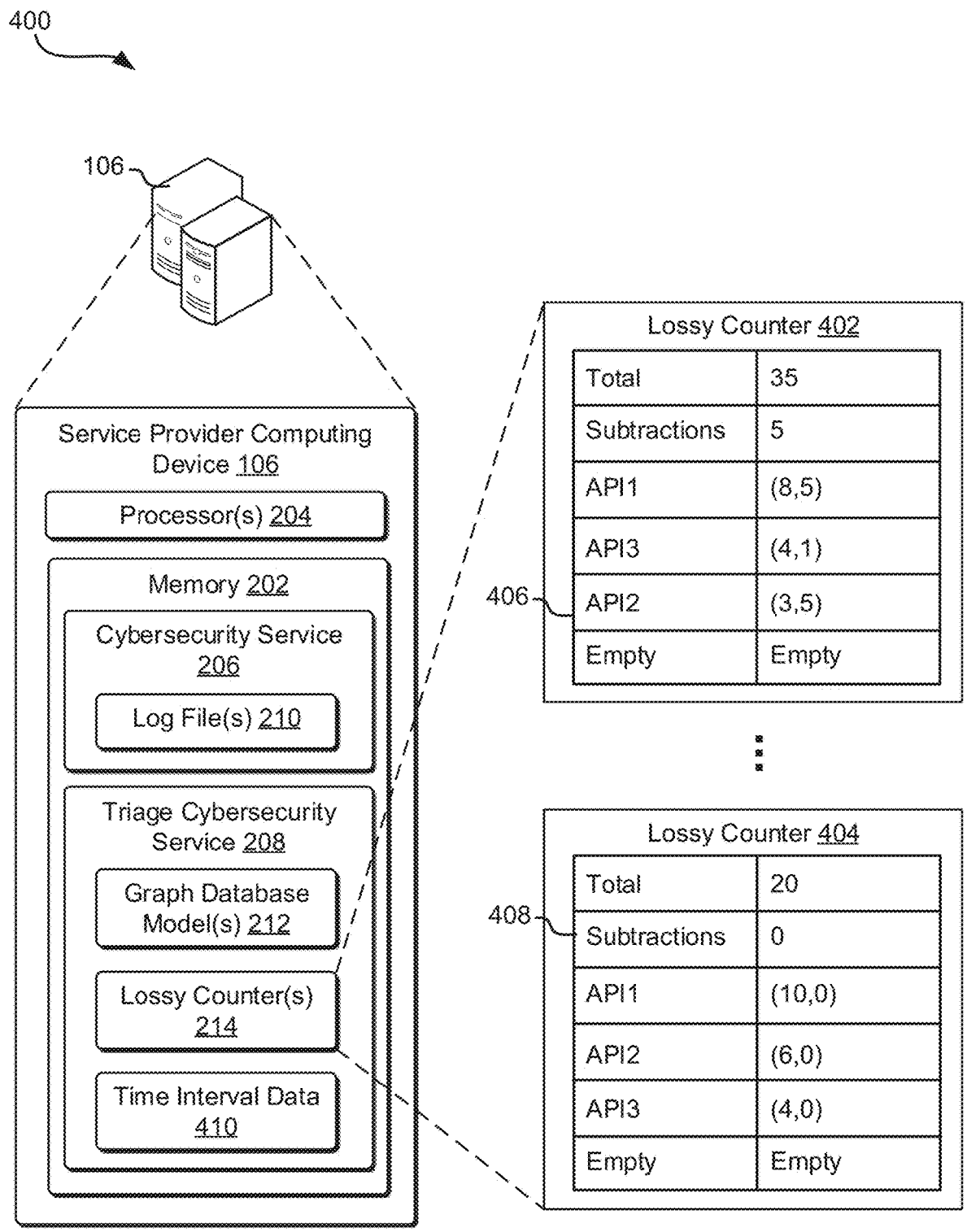
FIG. 4 illustrates additional details of lossy counters associated with one or more service provider computing devices that may implement one or more of the described lossy count implementations.

FIG. 4 illustrates additional details 400 of lossy counters associated with one or more service provider computing devices that may implement one or more of the described lossy count implementations. In this illustration, lossy counters 402 and 404 are generated by the triage cybersecurity service 208. The lossy counters 402 and 404 may be associated with one or more of the graph database models 212, such as the graph database model 212 illustrated in FIG. 3 or the graph database model 114 illustrated in FIG. 1.

Each of the lossy counters 402 and 404 may be associated with a particular time interval. Moreover, each of the lossy counters 402 and 404 may be associated with a date in which the particular time interval occurs. In one example, the lossy counter 402 is associated with a time interval between 1 PM and 2 PM on a particular date. The lossy counter 404 is associated with the time interval between 2 PM and 3 PM on the particular date. It is contemplated that time intervals associated with lossy counters may be shorter or longer than those associated with the lossy counters 402 and 404. Time intervals associated with lossy counters narrow which network data items may be counted and included in the lossy counters. Specifically, timestamps associated with network data items may be used to ensure that only time relevant network data item references are included in a given lossy counter that includes an associated time interval. Time interval data 410 for the lossy counters 204 may be stored by the triage cybersecurity service 208.

Details related to network data items counted by the lossy counters 402 and 404 are now provided with reference to FIG. 4. The process of counting network data items by way of a lossy counter, such as the lossy counter 402 or 404, is provided in the description that follows and with reference to FIG. 5. The lossy counter 402 includes a count sketch S embodied in a hash map 406. In this example, the hash map 406 may contain no more than three (3) distinct network data item references. The distinct network data items are identified in the hash map 406 as API1, API2, and API3. Each of the API1, API2, and API3 are distinct API calls. The maximum number of distinct network items that may be counted in a hash map 406 is defined by a predetermined value K, so for the lossy counter 402 K=3.

Each distinct network data item contained in the hash map 406 has an associated tuple (c,d). The c value of a given tuple is the lossy count associated with a network data item and the d value is a decrement associated with the network data item. The hash map 406 further includes a total number of distinct network items N seen by the lossy counter 402 at any given time over a time interval associated with the lossy counter 402. In this illustration, the lossy counter 402 shows that N=35. The hash map 406 also includes a total number of distinct network data item references subtracted s from the lossy counter 402 at any given time over the time interval associated with the lossy counter 402. In this illustration, the lossy counter 402 shows that s=5. The lossy counter 404 also includes a count sketch S embodied as a hash map 408. The lossy counter 404 also includes the distinct network data items API1, API2, and API3. However, these distinct network data items are counted over a different time interval compared to the time interval associated with the lossy counter 402.

Figure 5:
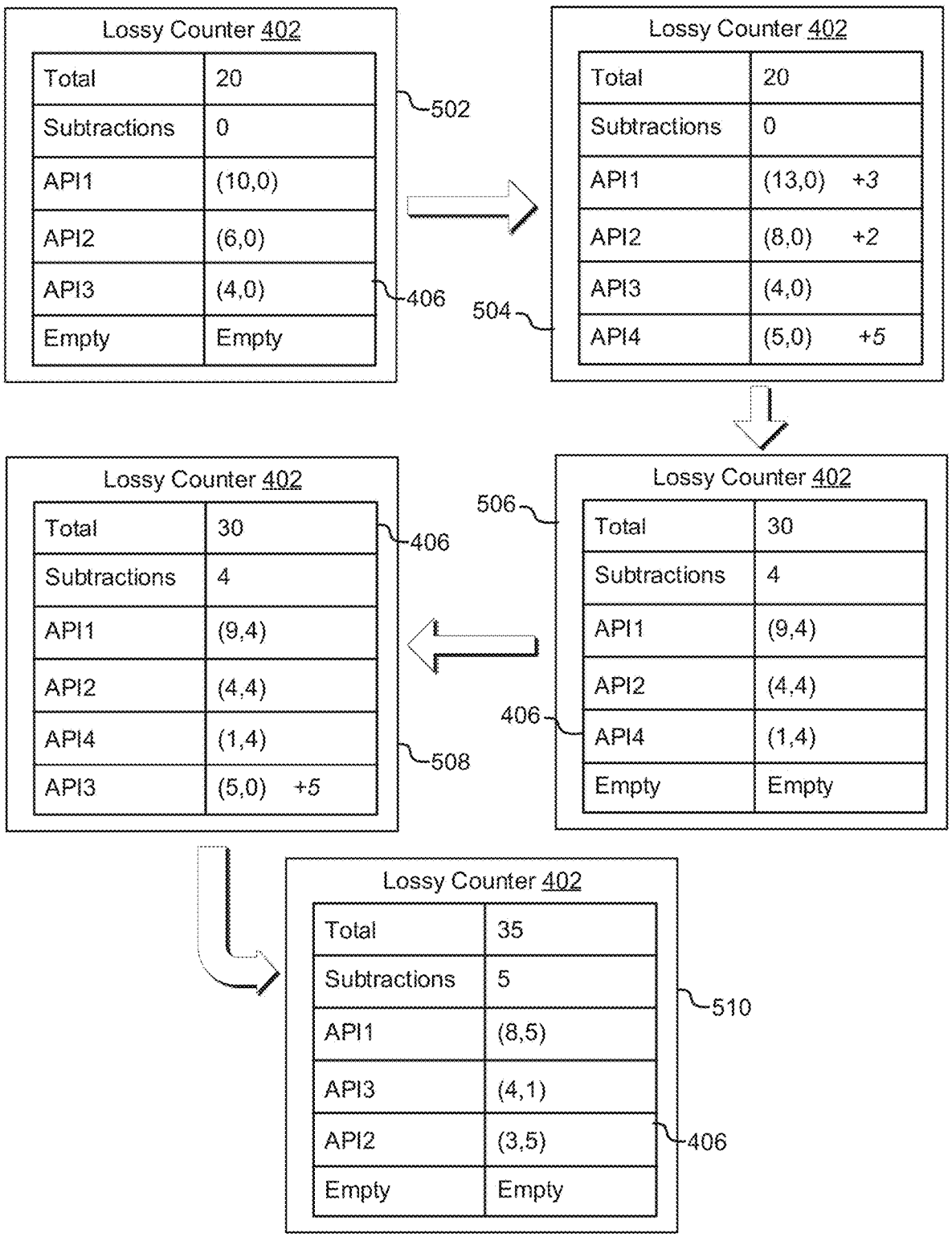
FIG. 5 illustrates iterative processing for generating a lossy counter according to the lossy count implementations.

FIG. 5 illustrates iterative processing 502-510 for generating the lossy counter 402 according to the lossy count implementations. The same processing may be used to generate other one or more lossy counters. The processing 502-510 may be performed by the triage cybersecurity service 208 with reference to one or more of the log files 210 and network data item information contained in the one or more log files 210. As indicated, in some implementations, the network data item information contained in the one or more log files 210 may be streamed to the triage cybersecurity service 208.

At processing 502, the triage cybersecurity service 208 commences the processing of the one or more log files 210 to identify counts of distinct API calls. In some implementations, the triage cybersecurity service 208 may analyze a data stream of API calls stored in the one or more log files 210 and streamed to the triage cybersecurity service 208 via the cybersecurity service 206. Network data item information for consideration by the triage cybersecurity service 208 may alternatively be communicated from the cybersecurity service 206 over a different medium. At the instance of the processing 502, the triage cybersecurity service 208 identifies 10 counts of API1, 6 counts of API2, and 4 counts of API3 from one or more of the log files 210.

At processing 504, processing of the one or more log files 210 performed by the triage cybersecurity service 208 identifies additional API calls. In particular, the count for API1 is now 13 and the count for API2 is now 8. The processing 504 identifies a new API call (API4). The count for API4 is 5. The processing 504 results in the lossy counter 402 including distinct API calls that exceed the predetermined value (K=3) for the count sketch 5, which as indicated, is embodied as the hash map 406. In this example, API3 should be evicted from the count sketch S of the lossy counter 402 to ensure that the lossy counter 402 is at or below the predetermined value K=3 for the count sketch S.

At processing 506, the lossy counter 402 is shown as having evicted API3 from the count sketch. The process of evicting a distinct network data item contained in the hash map 406 involves moving counts from c to d for each distinct network data item contained in the hash map 406. When a count c reaches 0 for any network data item associated with the hash map 406, that network data item is evicted from the lossy counter 402. In this illustrative example, the count c for API3 reached 0, so it was evicted from the lossy counter 402. At processing 506, the subtractions total s is updated to reflect the total number of network data item references evicted (s=4) from the lossy counter 402.

At processing 508, the triage cybersecurity service 208 identifies additional API calls. In particular, 5 counts of API3 are identified from one or more of the log files 210. Once again, the lossy counter 402 exceeds the predetermined value (K=3), so the processing 508 evicts API4 from the count sketch of the lossy counter 402.

At processing 510, the lossy counter 402 is updated to reflect the eviction of API4 and the addition of API3. Furthermore, the triage cybersecurity service 208 updates the lossy counter 402 to reflect the total number of distinct network items N=35 processed by the lossy counter 402 and the subtractions from the lossy counter 402 is updated to s=5. The lossy counter 402 is also sorted, as shown, from most prevalent API call to least prevalent API call in the count.

The process described in the foregoing is summarized in the following, where e is a network data item, N is the total number of network data items references, S is the count sketch embodied by the hash map 406, K is the predetermined value, and s is the total number of network items subtracted from S.

```
1  append(e);
2  N ← N + 1;
3  if e ∈ S then
4  |  (c,d) ← S(e);
5  |  S(e) ← (c + 1,d);
6  else
7  |  S(e) ← (1,0);
8  end
9  if ‖S‖ > K then
10 |  (S,s) ← prune(S,s)
11 end
```

```
1  prune(S, s):
2  if ‖S‖ > K then
3  |  return S, s
4  else
5  |  L = sort(S);         // Sort S by c in the (c, d) tuple, descending
6  |  (C, D) ← L|K|;       // Get c value of (K+1)-st element of sorted list
7  |  for e ∈ S do
8  |  |  (c, d) ← S(e);
9  |  |  if c ≤ C then
10 |  |  |  delete S(e);
11 |  |  else
12 |  |  |  S(e) ← (c − C, d + C);
13 |  |  end
14 |  end
15 |  s ← S + C;
16 |  return S, s
17 end
```

Figure 6:
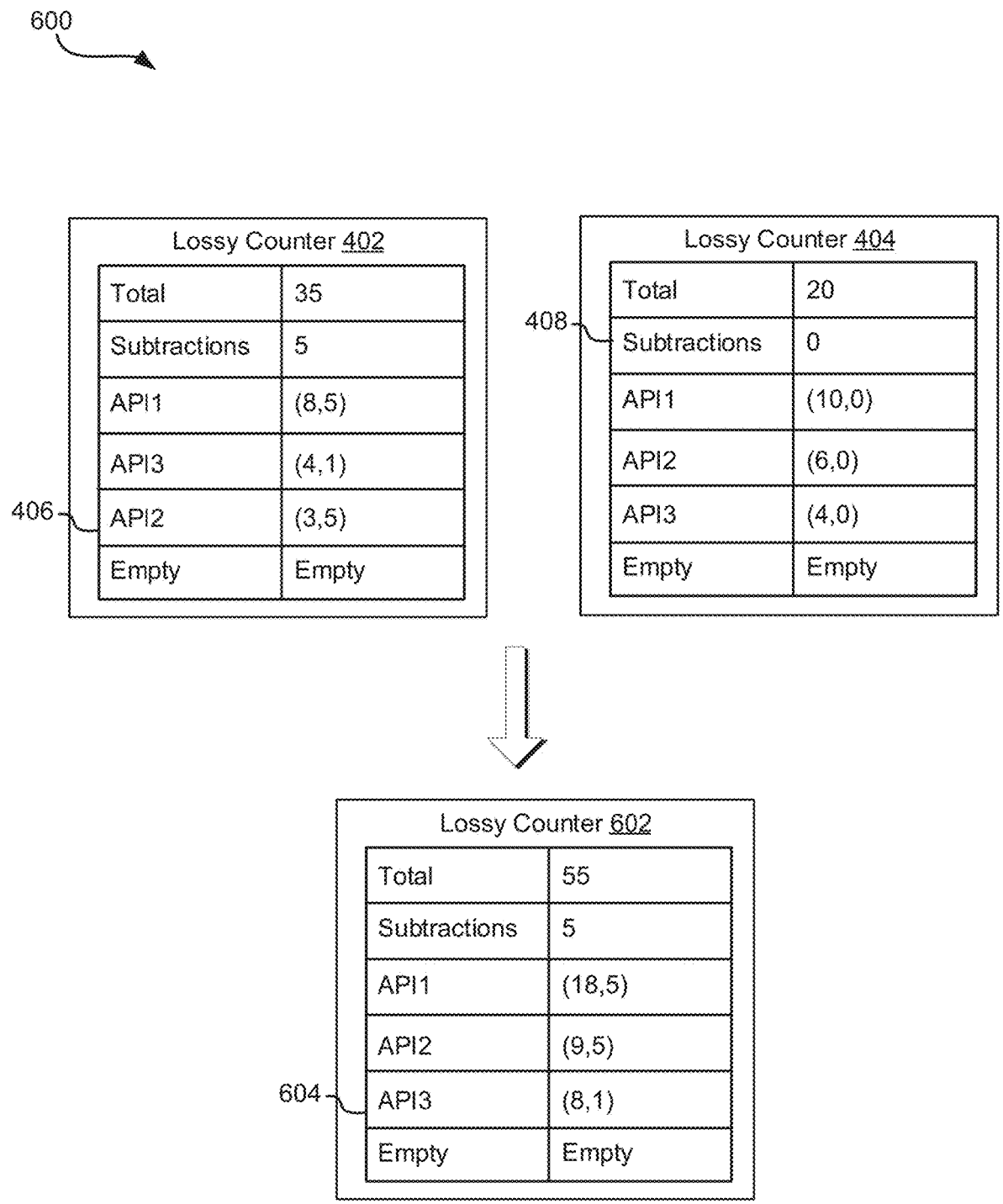
FIG. 6 illustrates merging two lossy counters to provide a merged lossy counter according to the lossy count implementations.

FIG. 6 illustrates merging two lossy counters to provide a merged lossy counter according to the lossy count implementations. The lossy count implementations may be used to merge, as needed per analysis requirements, lossy counters in adjacent time intervals to down sample the time series. A merged lossy counter may also be generated from merging lossy counters from non-adjacent time intervals. In some implementations parallel computing may be used to process batches of log files. Separate batches may each have log entries that fall into the same time interval. Each batch builds a lossy counter for each time interval in its batch. Thus, the described implementations provide for merging lossy counters for the same time interval but from different batches. After this, each time interval has a single lossy counter for the records in that time interval that summarizes information across all batches.

In this example, lossy counters 402 and 404 are merged to generate the illustrated lossy counter 602 and associated count sketch implemented by a hash map 604. In this illustration, lossy counter 602 encompasses the time period between 1 PM and 3 PM, which is a merger of the 1 PM to 2 PM time interval of the lossy counter 402 and the 2 PM to 3 PM time interval of the lossy counter 404.

A process for merging two or more lossy counters is summarized in the following, where $L_1$ is the lossy counter 402 and $L_2$ is the lossy counter 404 in this example. The counters have $N_1$ and $N_2$ network data item references, summarized in count sketches $S_1$ and $S_2$, which have undergone $s_1$ and $s_2$ rounds of subtractions, respectively.

```
 1  merge(L₁, L₂):
 2  assert L₁.K = L₂.K;
 3  S₁ ← L₁.S;
 4  S₂ ← L₂.S;
 5  N₁ ← L₁.N;
 6  N₂ ← L₂.N;
 7  N_tot ← N₁ + N₂;
 8  s₁ ← L₁.s;
 9  s₂ ← L₂.s;
10  s_tot ← s₁ + s₂;
11  for e ∈ S₁ do
12  |   (c₁, d₁) ← S₁(e);
13  |   if e ∈ S₂ then
14  |   |   (c₂, d₂) ← S₂(e);
15  |   |   delete S₂(e);  // To simplify loop over S₂ keys later:
16  |   |   S_out(e) ← (c₁ + c₂, d₁ + d₂);
17  |   else
18  |   |   S_out(e) ← (c₁, d₁);
19  |   end
20  end
21  for e ∈ S₂ do          // Now contains only keys not in S₁
22  |   S_out(e) ← (c₂, d₂);
23  end
24  (S_out, s_tot) ← prune(S_out, s_tot);
25  return LossyCounter(K, S_out, N_tot, s_tot)
```

Upper and lower bounds for any network data item in a lossy counter may be calculated. Specifically, for any network data item e associated with one or more of the log files 210 and/or a data stream provided by the cybersecurity service 206 and counted by the lossy counter, the lower and upper bounds, $l(e)$ and $u(e)$, are given by $l(e)=c(e)+d(e)$ and $u(e)=c(e)+s$, respectively.

As long as a network data item e is not evicted from a given lossy counter, $c(e)$ increases by 1 each time it is found in the one or more log files and/or the data stream, and $c(e)$ decreases by 1 and $d(e)$ increases by 1 for every pruning round. Therefore, $c(e)+d(e)$ represents the exact count for e since the most recent time it was added to the count sketch. However, $c(e)+d(e)$ may not be an exact count for a given e, as the equation does not account for if e was previously in the count sketch, evicted, and then later re-added to the count sketch. Therefore, a true count for e could only be higher, so $c(e)+d(e)$ represents the lower bound for the item e.

Figure 7:
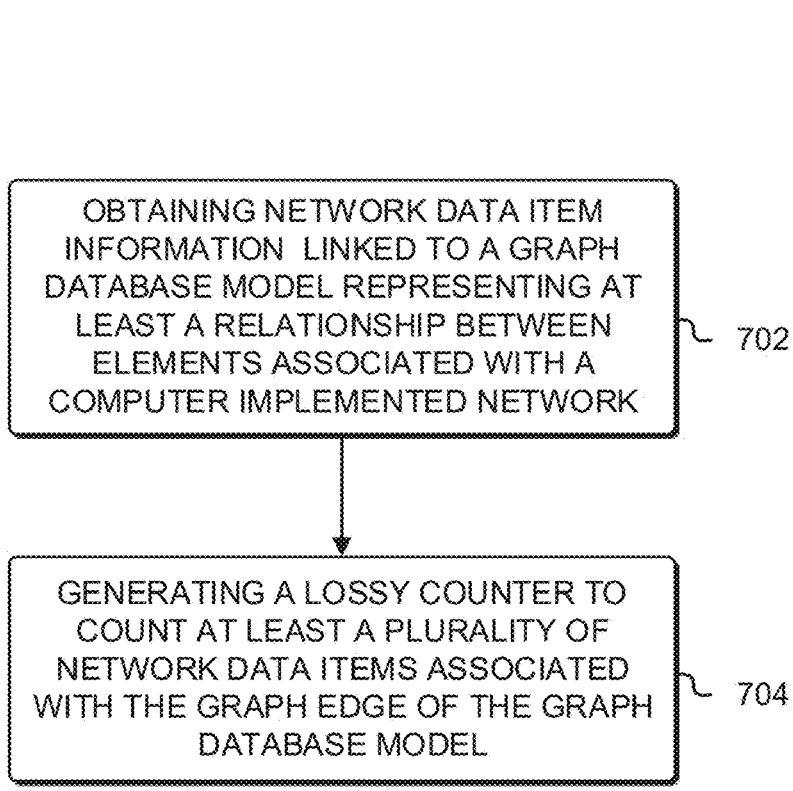
FIG. 7 shows an illustrative example of a process that, as a result of being performed by a distributed computing environment or other computing device, generates a lossy counter according to the lossy count implementations.

FIG. 7 illustrates a flow diagram 700 including various processing acts, implemented by a system environment with one or more computing devices, which provide generation of one or more lossy counters. In some implementations, the acts of the flow diagram 700 are executed by one or more computing devices of the example system environment 104 and/or system 900 illustrated in the figures. The example system environment 104 and/or system 900 may execute computer-executable instructions incorporating at least some of the processing acts of the flow diagram 700 to provide generation of one or more lossy counters.

In some implementations, it may be beneficial to represent the distribution of network data items referenced in one or more log files or a data stream D. A normalized estimator, $n(e)$ is defined, such that $$\sum_{e \in D} n(e) = N$$

where N is the number of network data items referenced in the data stream D. The probability estimate for e is determined by dividing by N, such that the sum of probabilities for all distinct network data items referenced in the stream D sum to one:

$$\sum_{e \in D} p(e) = \sum_{e \in D} \frac{n(e)}{N} = 1$$

The upper and lower bounds given in the foregoing equations are satisfied when a lossy counter is exact. However, when the lossy counter is not exact, it is possible to obtain an estimation of the cardinality C from other sources, such as through the use of HyperLogLog. Once C is obtained, a new estimate is generated that is used for a properly normalized probability, to within the accuracy of the cardinality estimate C. Specifically, the following equation is used to define exact network data items ε and lost network data items L:

$$\mathcal{E} = \sum_{e \in S} l(e) \text{ and } L = N - \mathcal{E}$$

The exact network data items are given by the sum of the lower bounds of all network data items in the sketch count S. These are the network data items of the data stream D that are accounted for exactly. In particular, it is known with certainty that these network data items each occurred at least that many times in the data stream D. The lost network data items are the remainder. There may have been further occurrences of network data items in the count sketch S, or occurrences of network data items not presently in the count sketch S. It is not possible to indicate with certainty which network data items occurred or how frequently they occurred. However, from the exact network data items and the total network data items N it is possible to determine how many lost network data items are in the total. Thus, it is possible to determine a properly normalized estimate. A scheme to redistribute the lost network data items among all the network data items of the data stream D is provided.

An uncertainty $U(e)$ of a network data item e is defined to be the difference between its lower $l(e)$ and upper $u(e)$ bounds. A sketch uncertainty $U_S$, a tail uncertainty $U_T$ and a total uncertainty U are defined by the following equations.

$$U_S = \sum_{e \in S} u(e) - l(e)$$

$$U_T = \sum_{e \in T} u(e) - l(e) = (C - \|S\|))_8$$

$$U = \sum_{e \in D} U(e) = U_S + U_T$$

In the following it should be understood that $(C-\|S\|)$ network data items that are in the tail T. For those network data items the lower bound is zero and the upper bound is the number of subtractions s from the count sketch S. An uncertainty coefficient is defined as $$v = \frac{L}{U}.$$

Lost samples L are distributed among all network data items proportionate to their uncertainty. The normalized estimate is given by the following:

$$n(e) = l(e) + v(u(e) - l(e))$$
$$= l(e) + vU(e)$$

Accordingly, for network data items know exactly, U(e)=0, and l(e)=u(e)=n(e), so the normalize estimate is exact.

Now, when the normalized estimate for every network data item in the data stream D are summed, all N network data items are recovered. See the following equations.

$$\sum_{e \in D} n(e) = \sum_{e \in D} l(e) + v \sum_{e \in D} U(e)$$
$$= \sum_{e \in D} l(e) + \left(\frac{\mathcal{L}}{u}\right)u$$
$$= \mathcal{E} + \mathcal{L}$$
$$= N$$

If fine tuning of the approximate probability distribution is desired, it is possible to distribute lost network data items in some other manner. For example, if the underlying distribution has heavy tails, most of the lost network data items will be well out into the tail. In that scenario, increasing the coefficients for the tail and decreasing the coefficient for all network data items in the count sketch might be a reasonable fine tuning approach. Conversely, if the distribution has light tails, it may be beneficial to increase the coefficients in the count sketch and decrease the coefficients in the tail.

The particular implementation of the technologies disclosed herein is a matter of choice dependent on the performance and other requirements of the computing device. Accordingly, the logical operations, also referred to as acts, described herein are referred to variously as states, operations, structural devices, acts, or modules. These states, operations, structural devices, acts and modules can be implemented in hardware, software, firmware, in special-purpose digital logic, and any combination thereof. It should be appreciated that more or fewer operations can be performed than shown in the figures and described herein. These operations can also be performed in a different order than those described herein. It should also be understood that the methods described herein can be ended at any time and need not be performed in their entireties.

Some or all operations of the methods described herein, and/or substantially equivalent operations, can be performed by execution of computer-readable instructions included on a computer-storage media. The term "computer-readable instructions," and variants thereof, as used in the description and claims, is used expansively herein to include routines, applications, application modules, program modules, system modules, programs, components, data structures, algorithms, and the like. Computer-readable instructions can be implemented on various system configurations, including single-processor or multiprocessor systems, minicomputers, mainframe computers, distributed computer systems, personal computers, hand-held computing devices, microprocessor-based, programmable consumer electronics, combinations thereof, and the like.

Thus, it should be appreciated that the logical operations described herein are implemented (1) as a sequence of computer implemented acts or program modules running on a computing system and/or (2) as interconnected machine logic circuits or circuit modules within the computing system. The implementation is a matter of choice dependent on the performance and other requirements of the computing system. Accordingly, the logical operations described herein are referred to variously as states, operations, structural devices, acts, or modules. These operations, structural devices, acts, and modules might be implemented in software, in firmware, in special purpose digital logic, and any combination thereof.

At block 702, network data item information is obtained. The network data item information may be linked to a graph database model representing at least a relationship between elements associated with a computer implemented network. In some implementations, the elements associated with the computer implemented network may be IP addresses, such as source and destination IP addresses. The relationship between the elements is defined in the graph database model by first and second graph nodes coupled via a graph edge. In some implementations, the network data item information is associated with the graph edge of the graph database model. The graph database model may be the graph database model 114 or the graph database model 212.

At block 704, a lossy counter is generated. The lossy counter counts at least a plurality of network data items identified in the network data item information associated with the graph edge of the graph database model. Specifically, the lossy counter includes a count sketch bounded by a predetermined value to limit a number of distinct network data items included in the count sketch. Furthermore, the count sketch includes a count for a first set of distinct network data items from the network data items associated with the graph edge, and a count for a second set of distinct data items from the network data items identified in the information associated with the graph edge.

In some implementations, the lossy counter has an associated time interval and the first set of distinct network data items and the second set of distinct data items include timestamps that coincide with the time interval associated with the lossy counter.

Figure 8:
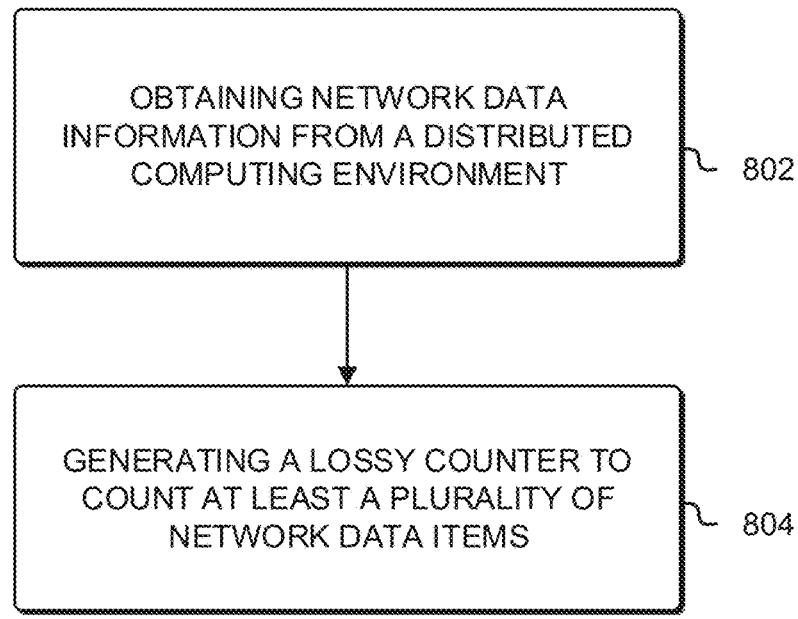
FIG. 8 shows another illustrative example of a process that, as a result of being performed by a distributed computing environment or other computing device, generates a lossy counter according to the lossy count implementations.

FIG. 8 illustrates a flow diagram 800 including various processing acts, implemented by a system environment with one or more computing devices, which provide generation of one or more lossy counters. In some implementations, the acts of the flow diagram 800 are executed by one or more computing devices of the example system environment 104 and/or system 900 illustrated in the figures. The example system environment 104 and/or system 900 may execute computer-executable instructions incorporating at least some of the processing acts of the flow diagram 800 to provide generation of one or more lossy counters.

At block 802, network data item information is obtained from storage hosted by a distributed computing environment. In some implementations, the network data items are associated with information linked to the graph edge of the graph database model. The graph database model may be the graph database model 114 or the graph database model 212.

At block 804, a lossy counter is generated to count at least a plurality of network data items in the network data item information. The lossy counter may comprise a count sketch bounded by a predetermined value to limit a number of distinct network data items included in the count sketch. The count sketch may include a count for a first set of distinct network data items from the network data items and a count for a second set of distinct data items from the network data items.

In some of the implementations, the lossy counter has an associated time interval and the first set of distinct network data items and the second set of distinct data items include timestamps that coincide with the time interval associated with the lossy counter.

Figure 9:
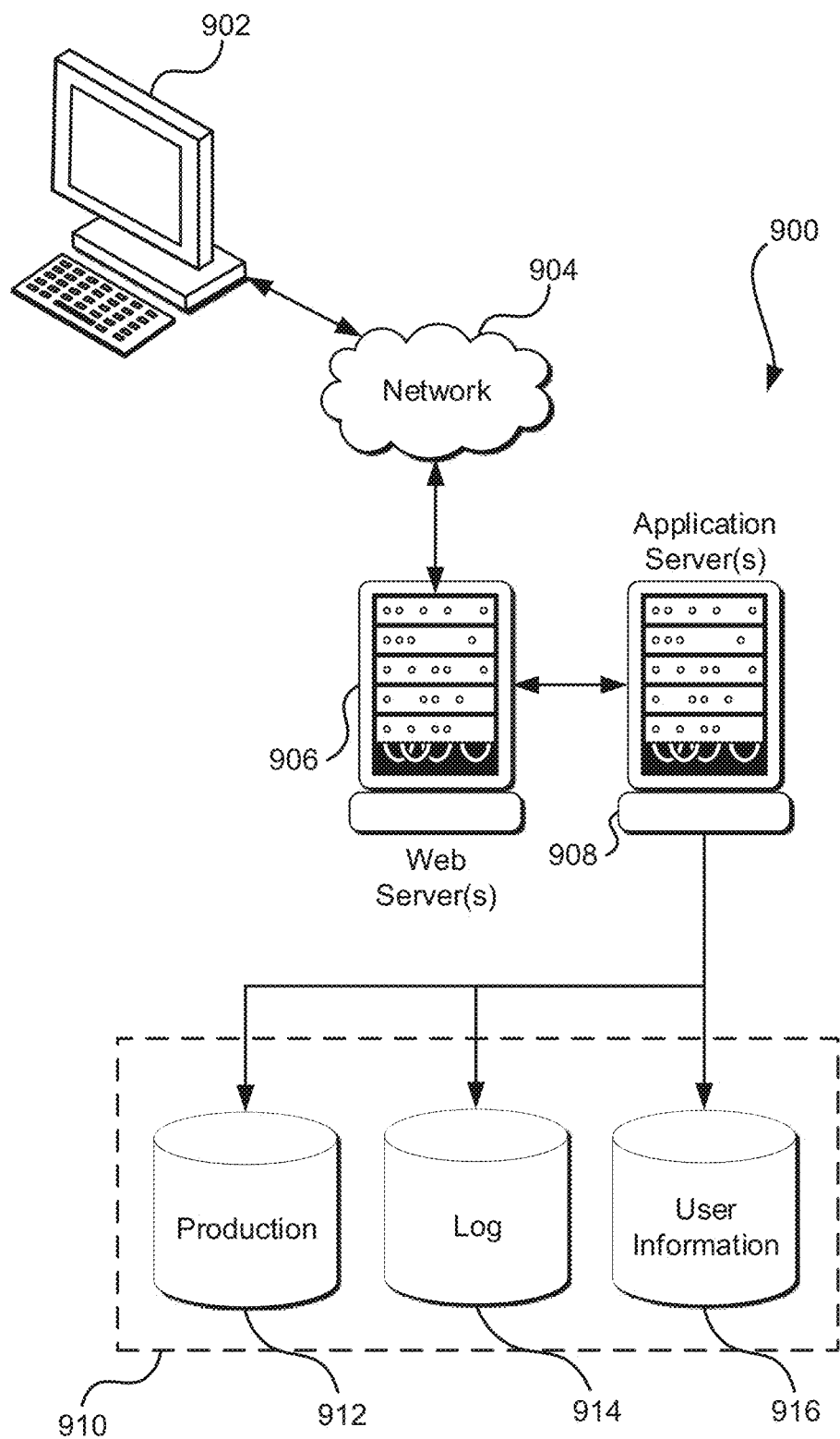
FIG. 9 illustrates a system in which various embodiments can be implemented.

FIG. 9 illustrates aspects of an example system 900 for implementing aspects in accordance with an embodiment. As will be appreciated, although a web-based system is used for purposes of explanation, different systems may be used, as appropriate, to implement various embodiments. In an embodiment, the system includes an electronic client device 902, which includes any appropriate device operable to send and/or receive requests, messages, or information over an appropriate network 904 and convey information back to a user of the device. Examples of such client devices include personal computers, cellular or other mobile phones, handheld messaging devices, laptop computers, tablet computers, set-top boxes, personal data assistants, embedded computer systems, electronic book readers, and the like. In an embodiment, the network includes any appropriate network, including an intranet, the Internet, a cellular network, a local area network, a satellite network or any other such network and/or combination thereof, and components used for such a system depend at least in part upon the type of network and/or system selected. Many protocols and components for communicating via such a network are well known and will not be discussed herein in detail. In an embodiment, communication over the network is enabled by wired and/or wireless connections and combinations thereof. In an embodiment, the network includes the Internet and/or other publicly addressable communications network, as the system includes a web server 906 for receiving requests and serving content in response thereto, although for other networks an alternative device serving a similar purpose could be used as would be apparent to one of ordinary skill in the art.

In an embodiment, the illustrative system includes at least one application server 908 and a data store 910, and it should be understood that there can be several application servers, layers or other elements, processes or components, which may be chained or otherwise configured, which can interact to perform tasks such as obtaining data from an appropriate data store. Servers, in an embodiment, are implemented as hardware devices, virtual computer systems, programming modules being executed on a computer system, and/or other devices configured with hardware and/or software to receive and respond to communications (e.g., web service application programming interface (API) requests) over a network. As used herein, unless otherwise stated or clear from context, the term "data store" refers to any device or combination of devices capable of storing, accessing and retrieving data, which may include any combination and number of data servers, databases, data storage devices and data storage media, in any standard, distributed, virtual or clustered system. Data stores, in an embodiment, communicate with block-level and/or object-level interfaces. The application server can include any appropriate hardware, software and firmware for integrating with the data store as needed to execute aspects of one or more applications for the client device, handling some or all of the data access and business logic for an application.

In an embodiment, the application server provides access control services in cooperation with the data store and generates content including but not limited to text, graphics, audio, video and/or other content that is provided to a user associated with the client device by the web server in the form of HyperText Markup Language ("HTML"), Extensible Markup Language ("XML"), JavaScript, Cascading Style Sheets ("CSS"), JavaScript Object Notation (JSON), and/or another appropriate client-side or other structured language. Content transferred to a client device, in an embodiment, is processed by the client device to provide the content in one or more forms including but not limited to forms that are perceptible to the user audibly, visually and/or through other senses. The handling of all requests and responses, as well as the delivery of content between the client device 902 and the application server 908, in an embodiment, is handled by the web server using PHP: Hypertext Preprocessor ("PHP"), Python, Ruby, Perl, Java, HTML, XML, JSON, and/or another appropriate server-side structured language in this example. In an embodiment, operations described herein as being performed by a single device are performed collectively by multiple devices that form a distributed and/or virtual system.

The data store 910, in an embodiment, includes several separate data tables, databases, data documents, dynamic data storage schemes and/or other data storage mechanisms and media for storing data relating to a particular aspect of the present disclosure. In an embodiment, the data store illustrated includes mechanisms for storing production data 912 and user information 916, which are used to serve content for the production side. The data store also is shown to include a mechanism for storing log data 914, which is used, in an embodiment, for reporting, computing resource management, analysis or other such purposes. In an embodiment, other aspects such as page image information and access rights information (e.g., access control policies or other encodings of permissions) are stored in the data store in any of the above listed mechanisms as appropriate or in additional mechanisms in the data store 910.

The data store 910, in an embodiment, is operable, through logic associated therewith, to receive instructions from the application server 908 and obtain, update or otherwise process data in response thereto, and the application server 908 provides static, dynamic, or a combination of static and dynamic data in response to the received instructions. In an embodiment, dynamic data, such as data used in web logs (blogs), shopping applications, news services, and other such applications, are generated by server-side structured languages as described herein or are provided by a content management system ("CMS") operating on or under the control of the application server. In an embodiment, a user, through a device operated by the user, submits a search request for a certain type of item. In this example, the data store accesses the user information to verify the identity of the user, accesses the catalog detail information to obtain information about items of that type, and returns the information to the user, such as in a results listing on a web page that the user views via a browser on the user device 902. Continuing with this example, information for a particular item of interest is viewed in a dedicated page or window of the browser. It should be noted, however, that embodiments of the present disclosure are not necessarily limited to the context of web pages, but are more generally applicable to processing requests in general, where the requests are not necessarily requests for content. Example requests include requests to manage and/or interact with computing resources hosted by the system 900 and/or another system, such as for launching, terminating, deleting, modifying, reading, and/or otherwise accessing such computing resources.

In an embodiment, each server typically includes an operating system that provides executable program instructions for the general administration and operation of that server and includes a computer-readable storage medium (e.g., a hard disk, random access memory, read only memory, etc.) storing instructions that, if executed by a processor of the server, cause or otherwise allow the server to perform its intended functions (e.g., the functions are performed as a result of one or more processors of the server executing instructions stored on a computer-readable storage medium).

The system 900, in an embodiment, is a distributed and/or virtual computing system utilizing several computer systems and components that are interconnected via communication links (e.g., transmission control protocol (TCP) connections and/or transport layer security (TLS) or other cryptographically protected communication sessions), using one or more computer networks or direct connections. However, it will be appreciated by those of ordinary skill in the art that such a system could operate in a system having fewer or a greater number of components than are illustrated in FIG. 9. Thus, the depiction of the system 900 in FIG. 9 should be taken as being illustrative in nature and not limiting to the scope of the disclosure.

The various embodiments further can be implemented in a wide variety of operating environments, which in some cases can include one or more user computers, computing devices or processing devices that can be used to operate any of a number of applications. In an embodiment, user or client devices include any of a number of computers, such as desktop, laptop or tablet computers running a standard operating system, as well as cellular (mobile), wireless and handheld devices running mobile software and capable of supporting a number of networking and messaging protocols, and such a system also includes a number of workstations running any of a variety of commercially available operating systems and other known applications for purposes such as development and database management. In an embodiment, these devices also include other electronic devices, such as dummy terminals, thin-clients, gaming systems and other devices capable of communicating via a network, and virtual devices such as virtual machines, hypervisors, software containers utilizing operating-system level virtualization and other virtual devices or non-virtual devices supporting virtualization capable of communicating via a network.

In an embodiment, a system utilizes at least one network that would be familiar to those skilled in the art for supporting communications using any of a variety of commercially available protocols, such as Transmission Control Protocol/Internet Protocol ("TCP/IP"), User Datagram Protocol ("UDP"), protocols operating in various layers of the Open System Interconnection ("OSI") model, File Transfer Protocol ("FTP"), Universal Plug and Play ("UpnP"), Network File System ("NFS"), Common Internet File System ("CIFS") and other protocols. The network, in an embodiment, is a local area network, a wide-area network, a virtual private network, the Internet, an intranet, an extranet, a public switched telephone network, an infrared network, a wireless network, a satellite network, and any combination thereof. In an embodiment, a connection-oriented protocol is used to communicate between network endpoints such that the connection-oriented protocol (sometimes called a connection-based protocol) is capable of transmitting data in an ordered stream. In an embodiment, a connection-oriented protocol can be reliable or unreliable. For example, the TCP protocol is a reliable connection-oriented protocol. Asynchronous Transfer Mode ("ATM") and Frame Relay are unreliable connection-oriented protocols. Connection-oriented protocols are in contrast to packet-oriented protocols such as UDP that transmit packets without a guaranteed ordering.

In an embodiment, the system utilizes a web server that runs one or more of a variety of server or mid-tier applications, including Hypertext Transfer Protocol ("HTTP") servers, FTP servers, Common Gateway Interface ("CGI") servers, data servers, Java servers, Apache servers, and business application servers. In an embodiment, the one or more servers are also capable of executing programs or scripts in response to requests from user devices, such as by executing one or more web applications that are implemented as one or more scripts or programs written in any programming language, such as Java®, C, C# or C++, or any scripting language, such as Ruby, PHP, Perl, Python or TCL, as well as combinations thereof. In an embodiment, the one or more servers also include database servers, including without limitation those commercially available from Oracle®, Microsoft®, Sybase®, and IBM® as well as open-source servers such as MySQL, Postgres, SQLite, MongoDB, and any other server capable of storing, retrieving, and accessing structured or unstructured data. In an embodiment, a database server includes table-based servers, document-based servers, unstructured servers, relational servers, non-relational servers, or combinations of these and/or other database servers.

In an embodiment, the system includes a variety of data stores and other memory and storage media as discussed above that can reside in a variety of locations, such as on a storage medium local to (and/or resident in) one or more of the computers or remote from any or all of the computers across the network. In an embodiment, the information resides in a storage-area network ("SAN") familiar to those skilled in the art and, similarly, any necessary files for performing the functions attributed to the computers, servers or other network devices are stored locally and/or remotely, as appropriate. In an embodiment where a system includes computerized devices, each such device can include hardware elements that are electrically coupled via a bus, the elements including, for example, at least one central processing unit ("CPU" or "processor"), at least one input device (e.g., a mouse, keyboard, controller, touch screen, or keypad), at least one output device (e.g., a display device, printer, or speaker), at least one storage device such as disk drives, optical storage devices, and solid-state storage devices such as random access memory ("RAM") or read-only memory ("ROM"), as well as removable media devices, memory cards, flash cards, etc., and various combinations thereof.

In an embodiment, such a device also includes a computer-readable storage media reader, a communications device (e.g., a modem, a network card (wireless or wired), an infrared communication device, etc.), and working memory as described above where the computer-readable storage media reader is connected with, or configured to receive, a computer-readable storage medium, representing remote, local, fixed, and/or removable storage devices as well as storage media for temporarily and/or more permanently containing, storing, transmitting, and retrieving computer-readable information. In an embodiment, the system and various devices also typically include a number of software applications, modules, services, or other elements located within at least one working memory device, including an operating system and application programs, such as a client application or web browser. In an embodiment, customized hardware is used and/or particular elements are implemented in hardware, software (including portable software, such as applets), or both. In an embodiment, connections to other computing devices such as network input/output devices are employed.

In an embodiment, storage media and computer readable media for containing code, or portions of code, include any appropriate media known or used in the art, including storage media and communication media, such as but not limited to volatile and non-volatile, removable and non-removable media implemented in any method or technology for storage and/or transmission of information such as computer readable instructions, data structures, program modules or other data, including RAM, ROM, Electrically Erasable Programmable Read-Only Memory ("EEPROM"), flash memory or other memory technology, Compact Disc Read-Only Memory ("CD-ROM"), digital versatile disk (DVD) or other optical storage, magnetic cassettes, magnetic tape, magnetic disk storage or other magnetic storage devices or any other medium which can be used to store the desired information and which can be accessed by the system device. Based on the disclosure and teachings provided herein, a person of ordinary skill in the art will appreciate other ways and/or methods to implement the various embodiments.

The specification and drawings are, accordingly, to be regarded in an illustrative rather than a restrictive sense. It will, however, be evident that various modifications and changes may be made thereunto without departing from the broader spirit and scope of the subject matter set forth in the claims.

Other variations are within the spirit of the present disclosure. Thus, while the disclosed techniques are susceptible to various modifications and alternative constructions, certain illustrated embodiments thereof are shown in the drawings and have been described above in detail. It should be understood however, that there is no intention to limit the subject matter recited by the claims to the specific form or forms disclosed but, on the contrary, the intention is to cover all modifications, alternative constructions, and equivalents falling within the spirit and scope of this disclosure, as defined in the appended claims.

The use of the terms "a" and "an" and "the" and similar referents in the context of describing the disclosed embodiments (especially in the context of the following claims) are to be construed to cover both the singular and the plural, unless otherwise indicated herein or clearly contradicted by context. Similarly, use of the term "or" is to be construed to mean "and/or" unless contradicted explicitly or by context. The terms "comprising," "having," "including," and "containing" are to be construed as open-ended terms (i.e., meaning "including, but not limited to,") unless otherwise noted. The term "connected," when unmodified and referring to physical connections, is to be construed as partly or wholly contained within, attached to, or joined together, even if there is something intervening. Recitation of ranges of values herein are merely intended to serve as a shorthand method of referring individually to each separate value falling within the range, unless otherwise indicated herein, and each separate value is incorporated into the specification as if it were individually recited herein. The use of the term "set" (e.g., "a set of items") or "subset" unless otherwise noted or contradicted by context, is to be construed as a nonempty collection comprising one or more members. Further, unless otherwise noted or contradicted by context, the term "subset" of a corresponding set does not necessarily denote a proper subset of the corresponding set, but the subset and the corresponding set may be equal. The use of the phrase "based on," unless otherwise explicitly stated or clear from context, means "based at least in part on" and is not limited to "based solely on."

Conjunctive language, such as phrases of the form "at least one of A, B, and C," or "at least one of A, B and C," (i.e., the same phrase with or without the Oxford comma) unless specifically stated otherwise or otherwise clearly contradicted by context, is otherwise understood within the context as used in general to present that an item, term, etc., may be either A or B or C, any nonempty subset of the set of A and B and C, or any set not contradicted by context or otherwise excluded that contains at least one A, at least one B, or at least one C. For instance, in the illustrative example of a set having three members, the conjunctive phrases "at least one of A, B, and C" and "at least one of A, B and C" refer to any of the following sets: {A}, {B}, {C}, {A, B}, {A, C}, {B, C}, {A, B, C}, and, if not contradicted explicitly or by context, any set having {A}, {B}, and/or {C} as a subset (e.g., sets with multiple "A"). Thus, such conjunctive language is not generally intended to imply that certain embodiments require at least one of A, at least one of B and at least one of C each to be present. Similarly, phrases such as "at least one of A, B, or C" and "at least one of A, B or C" refer to the same as "at least one of A, B, and C" and "at least one of A, B and C" refer to any of the following sets: {A}, {B}, {C}, {A, B}, {A, C}, {B, C}, {A, B, C}, unless differing meaning is explicitly stated or clear from context. In addition, unless otherwise noted or contradicted by context, the term "plurality" indicates a state of being plural (e.g., "a plurality of items" indicates multiple items). The number of items in a plurality is at least two but can be more when so indicated either explicitly or by context.

Operations of processes described herein can be performed in any suitable order unless otherwise indicated herein or otherwise clearly contradicted by context. In an embodiment, a process such as those processes described herein (or variations and/or combinations thereof) is performed under the control of one or more computer systems configured with executable instructions and is implemented as code (e.g., executable instructions, one or more computer programs or one or more applications) executing collectively on one or more processors, by hardware or combinations thereof. In an embodiment, the code is stored on a computer-readable storage medium, for example, in the form of a computer program comprising a plurality of instructions executable by one or more processors. In an embodiment, a computer-readable storage medium is a non-transitory computer-readable storage medium that excludes transitory signals (e.g., a propagating transient electric or electromagnetic transmission) but includes non-transitory data storage circuitry (e.g., buffers, cache, and queues) within transceivers of transitory signals. In an embodiment, code (e.g., executable code or source code) is stored on a set of one or more non-transitory computer-readable storage media having stored thereon executable instructions that, when executed (i.e., as a result of being executed) by one or more processors of a computer system, cause the computer system to perform operations described herein. The set of non-transitory computer-readable storage media, in an embodiment, comprises multiple non-transitory computer-readable storage media, and one or more of individual non-transitory storage media of the multiple non-transitory computer-readable storage media lack all of the code while the multiple non-transitory computer-readable storage media collectively store all of the code. In an embodiment, the executable instructions are executed such that different instructions are executed by different processors—for example, in an embodiment, a non-transitory computer-readable storage medium stores instructions and a main CPU executes some of the instructions while a graphics processor unit executes other instructions. In another embodiment, different components of a computer system have separate processors and different processors execute different subsets of the instructions.

Accordingly, in an embodiment, computer systems are configured to implement one or more services that singly or collectively perform operations of processes described herein, and such computer systems are configured with applicable hardware and/or software that enable the performance of the operations. Further, a computer system, in an embodiment of the present disclosure, is a single device and, in another embodiment, is a distributed computer system comprising multiple devices that operate differently such that the distributed computer system performs the operations described herein and such that a single device does not perform all operations.

The use of any and all examples or exemplary language (e.g., "such as") provided herein is intended merely to better illuminate various embodiments and does not pose a limitation on the scope of the claims unless otherwise claimed. No language in the specification should be construed as indicating any non-claimed element as essential to the practice of inventive subject material disclosed herein.

Embodiments of this disclosure are described herein, including the best mode known to the inventors for carrying out inventive concepts described herein. Variations of those embodiments may become apparent to those of ordinary skill in the art upon reading the foregoing description. The inventors expect skilled artisans to employ such variations as appropriate, and the inventors intend for embodiments of the present disclosure to be practiced otherwise than as specifically described herein. Accordingly, the scope of the present disclosure includes all modifications and equivalents of the subject matter recited in the claims appended hereto as permitted by applicable law. Moreover, any combination of the above-described elements in all possible variations thereof is encompassed by the scope of the present disclosure unless otherwise indicated herein or otherwise clearly contradicted by context.

All references including publications, patent applications, and patents cited herein are hereby incorporated by reference to the same extent as if each reference were individually and specifically indicated to be incorporated by reference and were set forth in its entirety herein.

What is claimed is:

1. A computer-implemented method for counting network data items associated with a computer implemented network, the method comprising:
   obtaining information related to the network data items, the information linked to a graph database model representing at least a relationship between elements associated with the computer implemented network, the relationship between the elements defined in the graph database model by first and second graph nodes coupled via a graph edge representing communication between the elements associated with the first and second graph nodes, at least some of the information related to the network data items associated with the graph edge of the graph database model; and
   generating a lossy counter to count at least a plurality of the network data items identified in the information, the lossy counter comprising a count sketch bounded by a predetermined value to limit a number of distinct network data items included in the count sketch, the count sketch comprising a count for a first set of the distinct network data items from the network data items identified in the information and a count for a second set of the distinct network data items from the network data items identified in the information,
   wherein the lossy counter includes an associated time interval and the first set of the distinct network data items and the second set of the distinct network data items comprise associated timestamps that coincide with the time interval associated with the lossy counter.

2. The computer-implemented method of claim 1, wherein the first and second graph nodes of the graph database model each represent a distinct internet protocol (IP) address associated with the computer implemented network, a first of the distinct IP addresses being a source IP address and a second of the distinct IP addresses being a destination IP address, and wherein the network data items identified in the information associated with the graph edge of the graph database model are the network data items communicated between the source IP address and the destination IP address.

3. The computer-implemented method of claim 2, wherein the network data items communicated between the source IP address and the destination IP address comprise a plurality of application programming interface (API) calls, and information pertaining to the API calls is included in the information associated with the graph edge of the graph database model.

4. The computer-implemented method of claim 1, further comprising generating another lossy counter including an associated time interval being different than the time interval associated with the lossy counter; and merging the another lossy counter with the lossy counter to generate a merged lossy counter including a time interval that spans the time interval associated with the lossy counter and the time interval associated with the another lossy counter.

5. A computer-implemented method, comprising:
   obtaining network data item information from storage hosted by a distributed computing environment, at least some of the network data item information associated with suspected anomalous behavior linked to the distributed computing environment; and
   generating a lossy counter to count at least a plurality of network data items identified in the network data item information, the lossy counter comprising a count sketch bounded by a predetermined value to limit a number of distinct network data items included in the count sketch, the count sketch comprising a count for a bounded number of sets of the distinct network data items identified in the network data item information,
   wherein the lossy counter has an associated time interval and each set of the distinct network data items comprise associated timestamps that coincide with the time interval associated with the lossy counter.

6. The computer-implemented method of claim 5, wherein at least some of the network data item information is linked to a graph database model representing at least a relationship between elements associated with the distributed computing environment, the relationship between the elements defined in the graph database model by first and second graph nodes coupled via a graph edge of the graph database model.

7. The computer-implemented method of claim 6, wherein the first and second graph nodes of the graph database model each represent a distinct internet protocol (IP) address associated with the distributed computing environment, a first of the distinct IP addresses being a source IP address and a second of the distinct IP addresses being a destination IP address, and wherein at least some of the plurality of the network data items identified in the network data item information are the network data items communicated between the source IP address and the destination IP address.

8. The computer-implemented method of claim 5, wherein the network data item information is obtained from one or more log files or from a data stream comprising the network data item information.

9. The computer-implemented method of claim 5, further comprising generating another lossy counter including an associated time interval that is different than the time interval associated with the lossy counter.

10. The computer-implemented method of claim 9, further comprising merging the another lossy counter with the lossy counter to generate a merged lossy counter including a time interval that spans the time interval associated with the lossy counter and the time interval associated with the another lossy counter.

11. The computer-implemented method of claim 5, wherein the obtaining comprises receiving the network data item information from a cybersecurity service linked to the distributed computing environment.

12. The computer-implemented method of claim 11, wherein the network data item information from the cybersecurity service is associated with one or more log files or a data stream provided by the cybersecurity service.

13. A non-transitory computer-readable storage medium storing thereon executable instructions that, as a result of being executed by one or more processors of a computer system, cause the computer system to at least:
   obtain network data item information from a distributed computing environment; and
   generate a lossy counter to count at least a plurality of network data items identified in the network data item information, the lossy counter comprising a count sketch bounded by a predetermined value to limit a number of distinct network data items included in the count sketch, the count sketch comprising a count for a first set of the distinct network data items from the network data items identified in the network data item information and a count for a second set of the distinct network data items from the network data items identified in the network data item information,
   wherein the lossy counter has an associated time interval and the first set of the distinct network data items and the second set of the distinct network data items comprise associated timestamps that coincide with the time interval associated with the lossy counter.

14. The non-transitory computer-readable storage medium of claim 13, wherein the instructions further comprise instructions that, as the result of being executed by the one or more processors, cause the computer system to generate another lossy counter including an associated time interval that is different than the time interval associated with the lossy counter; and merge the another lossy counter with the lossy counter to generate a merged lossy counter including a time interval that spans the time interval associated with the lossy counter and the time interval associated with the another lossy counter.

15. The non-transitory computer-readable storage medium of claim 13, wherein the network data items identified in the network data item information are linked to a graph database model representing at least a relationship between elements associated with the distributed computing environment, the relationship between the elements defined in the graph database model by first and second graph nodes coupled via a graph edge, at least some of the network data items identified in the network data item information associated with the graph edge of the graph database model.

16. The non-transitory computer-readable storage medium of claim 15, wherein the first and second graph nodes of the graph database model each represent a distinct internet protocol (IP) address associated with the distributed computing environment, a first of the distinct IP addresses being a source IP address and a second of the distinct IP addresses being a destination IP address, and wherein the network data items identified in the network data item information and associated with the graph edge of the graph database model are the network data items communicated between the source IP address and the destination IP address.

17. The non-transitory computer-readable storage medium of claim 13, wherein the network data item information is obtained from one or more log files or from a data stream comprising the network data item information.

18. The non-transitory computer-readable storage medium of claim 13, wherein the count sketch further comprises a count for a total number of the distinct network data items counted by the lossy counter and a total number of the distinct network data items evicted from the lossy counter.

19. The non-transitory computer-readable storage medium of claim 13, wherein the network data item information is obtained from a cybersecurity service linked to the distributed computing environment.

20. The non-transitory computer-readable storage medium of claim 13, wherein the instructions further comprise instructions that, as the result of being executed by the one or more processors, cause the computer system to link the lossy counter to a graph database model representing at least a relationship between elements associated with the distributed computing environment, the relationship between the elements defined in the graph database model by first and second graph nodes coupled via a graph edge, the lossy counter linked to the graph edge coupling the first and second graph nodes.

* * * * *